June 23, 1925.
R. BOLETINO
ELECTRIC COOKING DEVICE
Filed Jan. 17, 1924
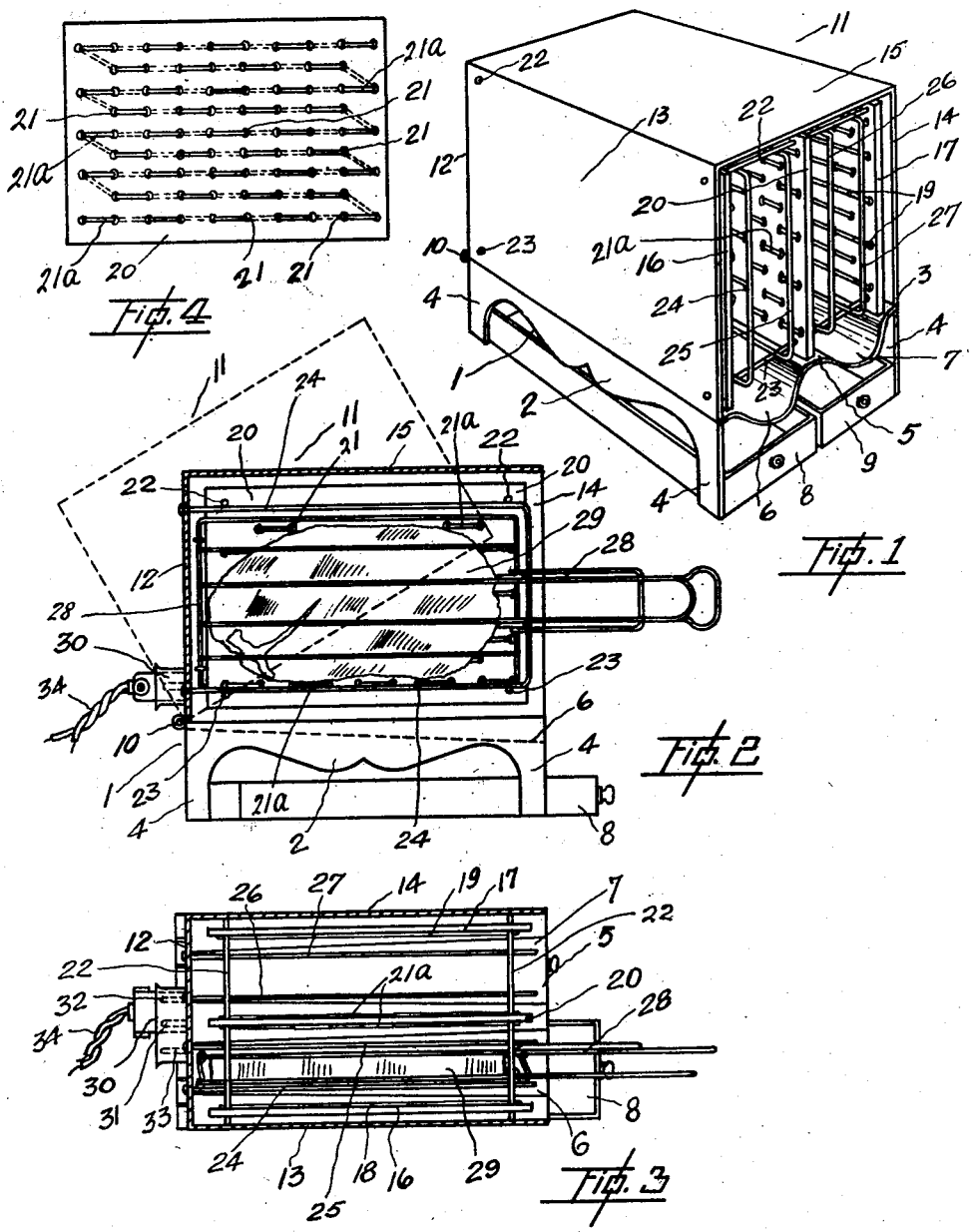
INVENTOR
Rosario Boletino.

Patented June 23, 1925.

1,543,362

UNITED STATES PATENT OFFICE.

ROSARIO BOLETINO, OF VANCOUVER, BRITISH COLUMBIA, CANADA.

ELECTRIC COOKING DEVICE.

Application filed January 17, 1924. Serial No. 686,845.

*To all whom it may concern:*

Be it known that I, ROSARIO BOLETINO, a subject of the King of Italy, and a resident of the city of Vancouver, in the Province of British Columbia, Canada, have invented certain new and useful Improvements in Electric Cooking Devices, of which the following is a specification.

My invention relates to improvements in electric cooking devices, and the object of my invention is to provide a device of this character particularly adapted for cooking steaks in a quick and convenient manner, although it may be used with equal facility for the cooking of other foods, such as fish, for instance, and which device is simple in construction, capable of being manufactured and sold at a comparatively low cost.

I attain this object by the construction illustrated in the accompanying drawings in which Fig. 1 is a perspective view of my device.

Fig. 2 is a side elevation, one side of the casing and the rear side electrical cooking element being removed.

Fig. 3 is a plan view, the top of the casing being removed.

Fig. 4 is a detail view, in side elevation, of one of the electrical cooking elements.

Similar figures of reference indicate similar parts throughout the several views.

The base of the device, indicated generally by the numeral 1, is preferably formed out of sheet metal and consists of two parallel sides 2 and 3 cut out to provide feet 4 at each corner of the base and connecting the two sides together at their top edges is a transverse plate 5, which plate is depressed so that two parallel spaced longitudinal troughs 6 and 7 are formed inclining downwardly towards their front ends, as shown in Figs. 1 and 2. Trays 8 and 9 are provided of a size capable of being inserted alongside each other between the feet 4 and under the respective troughs 6 and 7.

Hinged to the rear end of the base 1, as at 10, is a casing 11, also of sheet metal, having a back 12, sides 13 and 14, and top 15, which casing is open at the bottom and at the front end and completely covers the base 1, the hinged connection 10, however, enabling it to be swung upwardly, as indicated by the dotted lines in Fig. 2. Mounted within the casing 11 adjacent the two sides 13 and 14 and spaced at a suitable distance therefrom are two electrical cooking elements 16 and 17 respectively, each composed of a thin sheet of slate or other non-conducting material placed on edge on the inside face of which is secured by any approved means wiring, 18 and 19, respectively, arranged in any suitable manner to present the maximum heating surface, such as by placing the wire in parallel rows, as indicated at 19 in Fig. 1. A third element 20, similar to elements 16 and 17, is spaced intermediate them, but this element is wired on both faces, a suitable manner being that shown in Fig. 4, in which spaced rows of holes 21 are formed in the sheet, the wire 21ª being threaded through the holes, which are staggered. The three elements are secured in place by any suitable means, such as by strong wires top and bottom, indicated by the numerals 22 and 23 respectively, which extend through the elements close to their upper and lower edges in proximity to their opposite ends and are fixed rigidly at their opposite ends into the sides 13 and 14 of the casing.

Between each pair of cooking elements 16—20 and 20—17 are secured in any approved manner at their inner ends to the back of the casing wire frames 24—25 and 26—27 formed out of stout wire bent into rectangular form and the members of each pair of wire frames 24—25 and 26—27 are spaced apart from each other to permit insertion therebetween of a hand grid 28 and steak 29 held within the grid and the frames are also spaced from the respective cooking elements a sufficient distance to prevent the steak coming in contact with them yet near enough to allow of the heat being effectively applied to the sides of the steak. The front ends of the respective frames 24—25 and 26—27 are free and normally spaced from each other, as to the members of each pair, so that they have to be pressed apart when inserting the grid and steak which is then gripped and held without undue slackness when in place. In other words the frames 24—25 and 26—27 function in effect as spring jaws between which the grid and steak are held while cooking.

A three point plug switch, indicated by the numeral 30 and shown in Figs. 2 and 3 is provided on the back 12 of the casing, and the wires of the three elements 16, 17 and 20 are connected up to this switch in such a manner that when the switch is engaged on two of the points, say 31 and 32, the wires of the centre cooking element and one side element are electrified while when it is engaged on the points 31 and 33 all the cooking elements are electrified. This, however is a well-known electrical wiring arrangement and requires no further description.

From the foregoing it will be seen that the device consists essentially of a base on which are supported three suitably disposed and spaced cooking elements 16, 17, and 20 capable of being heated by electric current supplied by the wire 34 to the switch 30 and that two steaks may be inserted between the pairs of elements consisting of the centre one and each side one respectively and subjected to the heat from the elements, being held in place by the spring jaws formed by the wire frames 24—25 and 26—27, the juices from the steaks dropping into the troughs 6 and 7 and being collected in the trays 8 and 9. Thus, in use, all that is necessary is to insert a steak between the frames 24—25 or 26—27 as the case may be, or between both pairs of frames if two steaks are to be cooked and connect the switch whereupon the wires of the elements will be heated by the electrical current and the heat therefrom will cook the steak in a minimum time. On withdrawing the cooked steak the gravy, which has meanwhile collected in the trays, is ready for serving along with the steak, from which it will be seen that cooking of this character may be effected by the use of my device in an extremely expeditious and convenient manner.

What I claim as my invention is:—

1. An electric cooking device comprising a longitudinally troughed plate supported on feet to provide a space below it, a casing hingedly connected at its rear end to the rear end of said plate and covering the same, said casing being open at the bottom and the front end, and a pair of electric heating elements substantially rectangular in formation secured in said casing adjacent the opposite sides of the same and adapted for connection to an electric circuit, said elements being superposed edgewise along the opposite sides of the said trough.

2. An electric cooking device comprising a longitudinally troughed plate supported on feet to provide a space below it, a casing hingedly connected at its rear end to the rear end of said plate and covering the same, said casing being open at the bottom and the front end, a pair of electric heating elements substantially rectangular in formation secured in said casing adjacent the opposite sides of the same and adapted for connection to an electric circuit, said elements being superposed edgewise along the opposite sides of the said trough, and means for supporting a grid containing a steak between said elements and clear of the same.

3. An electric cooking device comprising a longitudinally troughed plate supported on feet to provide a space below it, a casing hingedly connected at its rear end to the rear end of said plate and covering the same, said casing being open at the bottom and the front end, a pair of electric heating elements substantially rectangular in formation secured in said casing adjacent the opposite sides of the same and adapted for connection to an electric circuit, said elements being superposed edgewise along the opposite sides of the said trough, and a pair of rectangular wire frames between the said elements secured at their rear ends forming jaws between which a grid containing a steak may be inserted.

4. An electric cooking device comprising a longitudinally troughed plate supported on feet to provide a space below it, a casing hingedly connected at its rear end to the rear end of said plate and covering the same, said casing being open at the bottom and front end, a pair of electric heating elements substantially rectangular in formation secured in said casing adjacent the opposite sides of the same and adapted for connection to an electric circuit, said elements being superposed edgewise along the opposite sides of the said trough, a pair of rectangular wire frames between the said elements secured at their rear ends forming spring jaws between which a grid containing a steak may be inserted, and bars extending through the said elements into the sides of the said casing on which the lower edge of the grid is supported when inserted between the elements.

5. An electric cooking device comprising a plate supported on feet to provide a space below it, said plate being troughed to provide two parallel longitudinally extending spaced troughs, a casing hingedly connected at its rear end to the rear end of the plate and covering the same, said casing being open at the bottom and front end, a pair of electrical heating elements secured in said casing adjacent the opposite sides of the same and a third electric heating element secured in the casing intermediate them, the said pair of elements being superposed along the outer edge of each trough respectively and the third element being superposed edgewise between the troughs, each member of the said pair being electrically wired on its inner face and the third one being electrically wired on both faces and all of them being adapted for connection to an electric circuit, and means for supporting a grid containing a steak between either member of the pair and the third one.

6. An electric cooking device comprising a longitudinally troughed plate supported on feet to provide a space below it, a pair of electrical heating elements substantially rectangular in formation adapted for connection to an electrical circuit superposed along the opposite sides of the said trough, and a pair of spaced rectangular wire frames between and spaced from the said elements forming jaws between which a grid may be inserted.

Dated at Vancouver, B. C., this 18th day of December, 1923.

ROSARIO BOLETINO.